(12) United States Patent
Nunes et al.

(10) Patent No.: US 7,350,414 B1
(45) Date of Patent: Apr. 1, 2008

(54) MECHANICAL BAROMETER

(75) Inventors: Brendon Nunes, Ajax (CA); Gregory Lowe-Wylde, Oshawa (CA)

(73) Assignee: Trintec Industries, Inc., Ajax, Ontario (CA)

( * ) Notice: Subject to any disclaimer, the term of this patent is extended or adjusted under 35 U.S.C. 154(b) by 446 days.

(21) Appl. No.: 11/122,033

(22) Filed: May 5, 2005

Related U.S. Application Data

(60) Provisional application No. 60/569,634, filed on May 11, 2004.

(51) Int. Cl.
*G01L 7/20* (2006.01)
(52) U.S. Cl. .......................... 73/384; 73/700
(58) Field of Classification Search .............. 73/384, 73/700
See application file for complete search history.

(56) References Cited

U.S. PATENT DOCUMENTS

| | | | | |
|---|---|---|---|---|
| 3,106,094 A | * | 10/1963 | Gallo | 73/701 |
| 3,175,393 A | * | 3/1965 | Sachers | 73/862.17 |
| 3,256,740 A | * | 6/1966 | Tate et al. | 73/701 |
| 3,555,909 A | * | 1/1971 | Harrah | 73/732 |
| 3,595,085 A | * | 7/1971 | Harrah | 73/729.1 |
| 4,238,958 A | | 12/1980 | Dostmann | |
| 4,246,796 A | * | 1/1981 | Wetterhorn | 73/732 |
| 4,255,970 A | | 3/1981 | Van Pottelberg | |
| 4,361,048 A | | 11/1982 | Huttinger | |
| 4,543,824 A | | 10/1985 | Marterer | |
| 4,733,564 A | | 3/1988 | Gorge | |
| 4,953,404 A | | 9/1990 | Bouteille et al. | |

* cited by examiner

*Primary Examiner*—Andre J. Allen

(57) ABSTRACT

An analog pressure indicator assembly, particularly useful as a barometer, accurately indicates pressure or pressure changes using the fewest number of and/or least expensive components possible. The assembly is typically gearless, and includes a pressure sensitive element [e.g. aneroid chamber] having a first portion that moves in a path in response to pressure. A cam has a first curved surface and a second surface, and is mounted for rotation about a first axis, and the curved first surface operatively engages the pressure sensitive element. A force transmitting element, and a shaft mounted for rotation about a second axis spaced from the first axis, and a pointer operatively connected to the shaft, are also provided. The force transmitting element may be a strand, or a strand in combination with a bar or rod, and operatively connects the cam second surface to the shaft in order to cause the shaft to rotate about the second axis in response to the pressure sensitive element rotating the cam about the first axis. Preferably a torsion spring or the like biases the cam into operative engagement with the pressure sensitive element. The cam may comprise a roller, ball bearing, or section of a ball bearing, or it may comprise a curved surface and lever (forming the second surface of the cam) that are integrally formed. A scale and housing are also typically provided, the pointer mounted within the housing to move with respect to the scale. The movement of the pressure sensing element may be linear, but if non-linear the cam curved surface is shaped to transform the non-linear movement into substantially precisely accurate arcuate movement of the pointer with respect to the scale.

20 Claims, 4 Drawing Sheets

MECHANICAL BAROMETER

CROSS REFERENCE TO RELATED APPLICATION

This application is based upon U.S. provisional application 60/569,634 filed May 11, 2004, the disclosure of which is incorporated by reference herein.

BACKGROUND AND SUMMARY OF THE INVENTION

The invention relates to a mechanical device that indicates pressure or pressure changes in an analog manner. Most desirably, the mechanical device of the invention serves as a barometer, but it can function to sense other types of pressure or pressure changes besides atmospheric pressure.

It has long been the goal of pressure sensors and gauges, particularly barometers, to accurately indicate pressure or pressure changes using the fewest number of and/or least expensive components possible. According to the invention this goal is accomplished, and additional advantages are provided. For example, in the barometer embodiment of the invention, aside from the pressure sensor (e.g. aneroid chamber) and pointer assembly (indicator and spindle or shaft), which are standard components of all barometers, the invention only comprises two basic elements, a cam, and a force transmitting element. In addition to being simple, this allows the barometer to be inexpensive; and the provision of the cam makes it possible to adjust the components to get linear or non-linear readouts, or to transform non-linear movement of a pressure sensing element into accurate arcuate movement of a pointer.

While under some circumstances the assembly of the invention may have one or more gears, typically gears are expensive and therefore are to be avoided. According to various aspects of the invention, an accurate yet simple gearless pressure indicator assembly (such as a barometer) may be provided. Also, the invention can achieve its objectives by using only a single stage of amplification (provided by the cam and lever attached thereto), as opposed to multiple stages in many prior art arrangements (e.g. see U.S. Pat. No. 4,238,958).

According to one aspect of the invention there is provided an analog pressure indicator assembly comprising: A pressure sensitive element having a first portion that moves in a path in response to pressure. A cam having a first curved surface and a second surface, and mounted for rotation about a first axis, and the curved first surface operatively engaging the first portion of the pressure sensitive element. A force transmitting element which is capable of transmitting a force. A shaft mounted for rotation about a second axis. A pointer operatively connected to the shaft. And, the force transmitting element operatively connecting the cam second surface to the shaft in order to cause the shaft to rotate in response to the pressure sensitive element rotating the cam about the first axis.

The terms "operatively connected" or "operative connection" or "operatively connecting" or "operatively connect" or "operative engagement", or the like, as used in this application mean—as they normally do—any type of link or device [no matter how simple or complex] that allows the components to function as desired.

Where the analog pressure indicator is a barometer, the pressure sensitive element comprises an aneroid chamber (sometimes alternatively called a vacuum chamber, or diaphragm). However, in its broadest aspects, the pressure sensitive element may comprise any conventional or to be hereafter developed mechanical element which senses pressure, or changes in pressure, such as a bourdon tube, rubber or other elastomeric material diaphragm, single or multiple segment bellows, or the like. The path of movement or deflection of the aneroid chamber may be almost precisely linear, or slightly arcuate or non-linear, or complex.

The cam may be made of plastic, or other inexpensive material, wood, metal, composite, or other suitable materials. The first axis about which the cam rotates is preferably substantially perpendicular to the path of movement of the aneroid chamber, and offset from the path of movement in such a way that movement of the aneroid chamber results in rotation of the cam. The cam second surface may comprise a lever arm connected to and extending away from the curved surface, although other configurations may be provided. The curved surface may be shaped to "linearize" the output of the pressure sensitive element. The cam curved surface has portions thereof which are spaced different distances from the first axis, and preferably the curved surface is continuous. The curved surface and lever may provide significant movement amplification (preferably using only a single stage of amplification), that is moving the shaft a greater angular amount than would be expected from a minute movement of the aneroid chamber. The first axis may be provided by a standard pivot pin, shaft stubs, or the like, or by a ball bearing arrangement.

The force transmitting element may be any element which is capable of transmitting a force. Preferably the force transmitting element is operatively connected at or adjacent one end thereof to the lever arm, and at or adjacent the other end to the shaft. The force transmitting element may comprise a bar, a rod, a strand [such as a cable, chain, wire, belt, rope, combination of these elements, or the like], or any other suitable mechanical element. The force transmitting element can be operatively connected to the cam by a pin, or through one or more other intermediate elements. The force transmitting element can also be operatively connected to the shaft by an intermediate element, such as a sprocket (particularly where part of the force transmitting element is a chain capable of engaging a sprocket).

The shaft may comprise a conventional spindle, and the second axis may be substantially perpendicular to (although offset from) the first axis. A conventional pointer is operatively connected to the shaft. The pointer may comprise any conventional or hereafter developed indicator (such as shown in U.S. Pat. Nos. 4,238,958, 4,255,970, 4,361,048, 4,543,824, 4,733,564, or 4,953,404, all incorporated by reference herein). The operative connection between the pointer and the spindle may be a sleeve extending from the pointer and adapted to fit tightly over, or be keyed to, the spindle.

According to another aspect of the invention, there is provided: A gearless barometer comprising: an aneroid chamber having a central portion which moves along a path; a cam having a curved surface which engages the aneroid chamber and which rotates about a first axis at a location spaced from the path; a pointer which rotates about a second axis at all times having the same relationship to the first axis; and an operative connection between the cam and the pointer which transforms rotation of the cam about the first axis to an accurately comparable rotation of the pointer about the second axis without gears. The cam curved surface is preferably biased into operative engagement with the aneroid chamber, as by a torsion spring.

According to another aspect of the invention, there is provided: A gearless pressure indicator assembly consisting essentially of: A pressure sensing element. A cam mounted for rotation about a first axis and having a curved surface engaging the pressure sensing element and a lever arm extending away from the pressure sensing element. A shaft mounted for rotation about a second axis spaced from the first axis, and operatively connected to a pointer. A combination bar/rod and strand operatively connected between the lever arm and shaft to transform pivotal movement of the lever arm into rotation of the shaft. And a biasing element which biases the cam curved surface into operative engagement with the pressure sensing element.

It is the primary object of the present invention to provide a device or assembly which accurately indicates pressure or pressure changes using the fewest number of and/or least expensive components possible. This and other objects of the invention will become clear from an inspection of the detailed description of the invention, and from the appended claims.

DETAILED DESCRIPTION OF THE DRAWINGS

Figure 1:
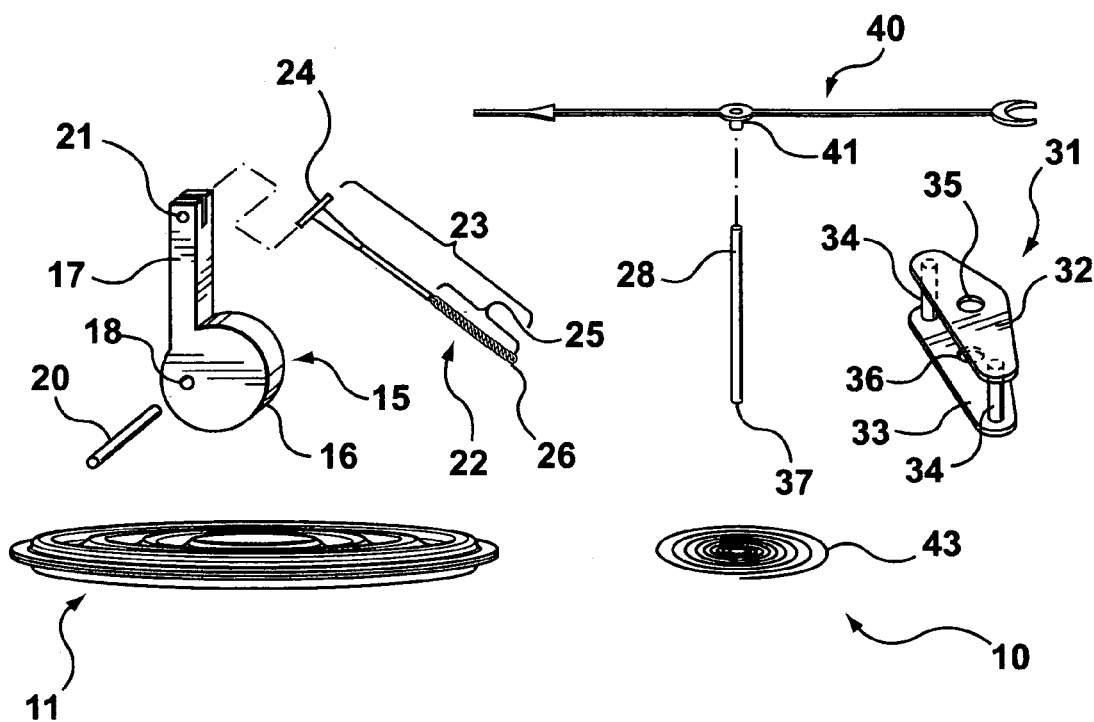
FIG. 1 is an exploded view of an exemplary analog pressure indicator assembly according to one embodiment of the present invention.
Figure 3:
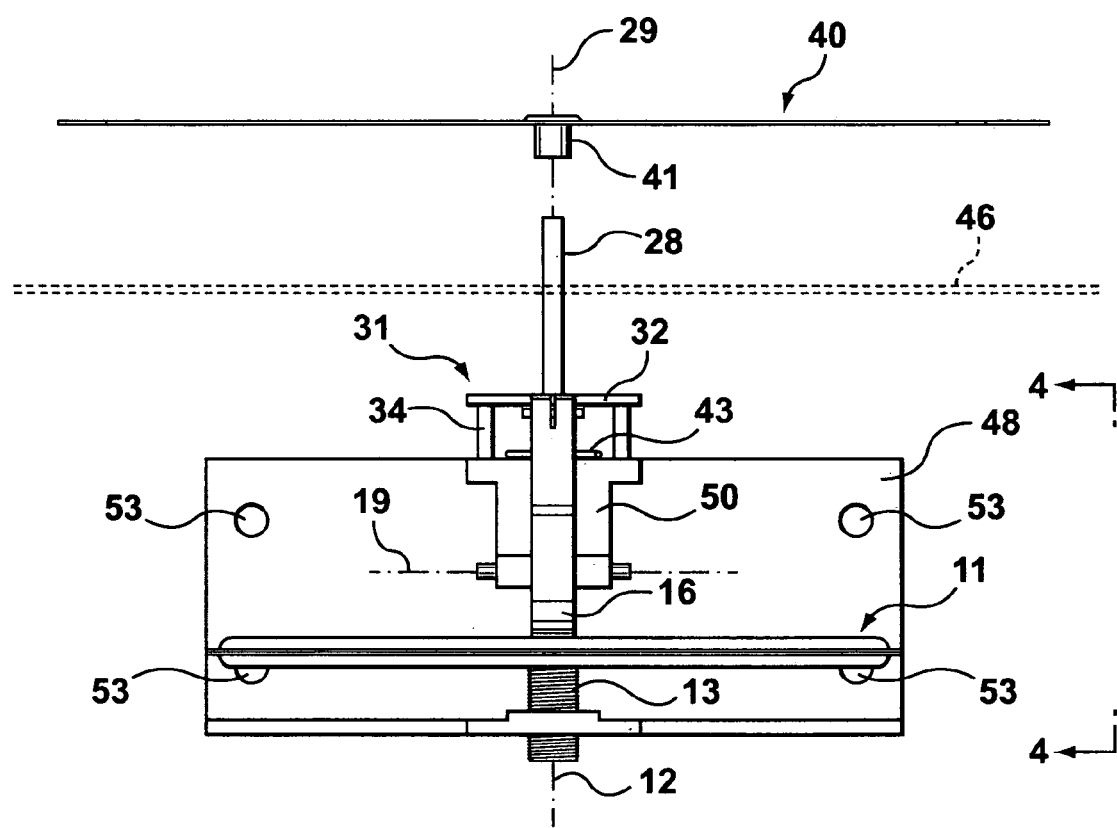
FIG. 3 is a front view of the assembly of FIG. 1 mounted in a suitable support looking in on arrows 3-3 of FIG. 4.
Figure 4:
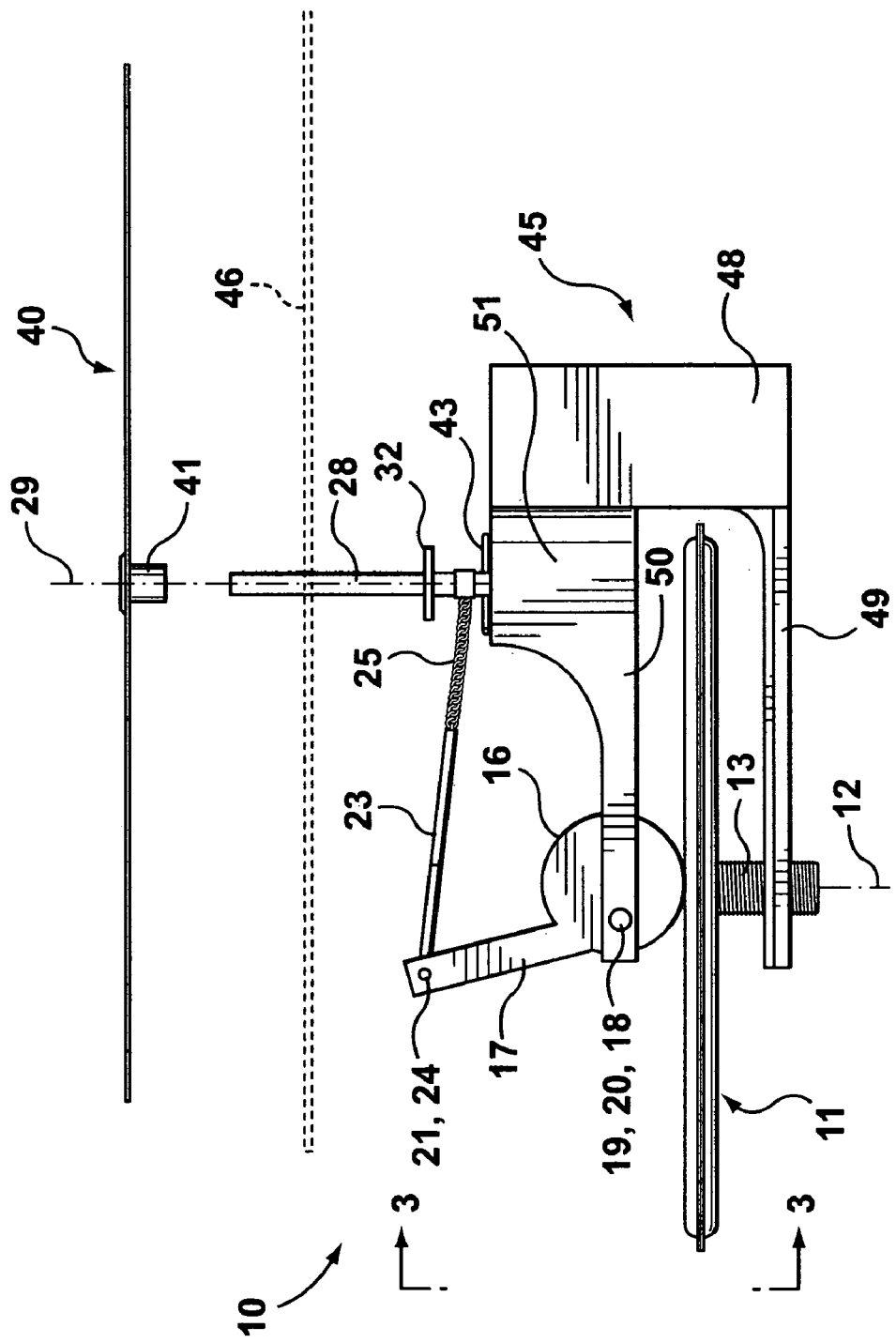
FIG. 4 is a side view of the assembly and support of FIG. 3 looking in on arrows 44 of FIG. 3.
Figure 5:
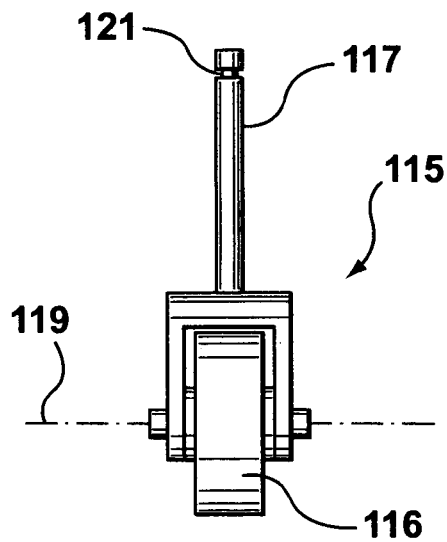
FIG. 5 is a front view of a modified form of cam and lever.
Figure 6:
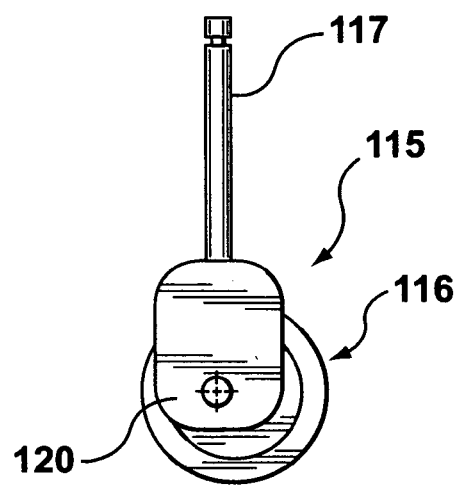
FIG. 6 a side view of the assembly of FIG. 5.
Figure 7:
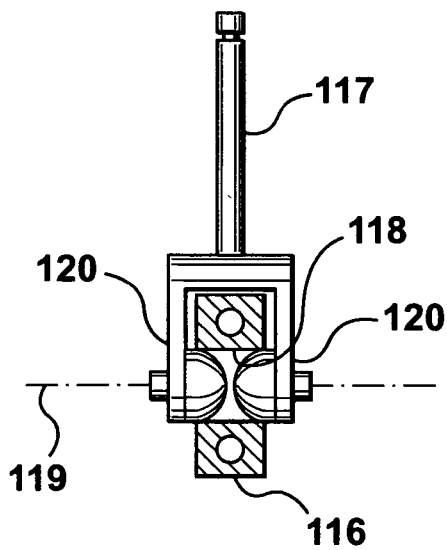
FIG. 7 a view like that of FIG. 5 only showing the cam in cross section.
Figure 8:
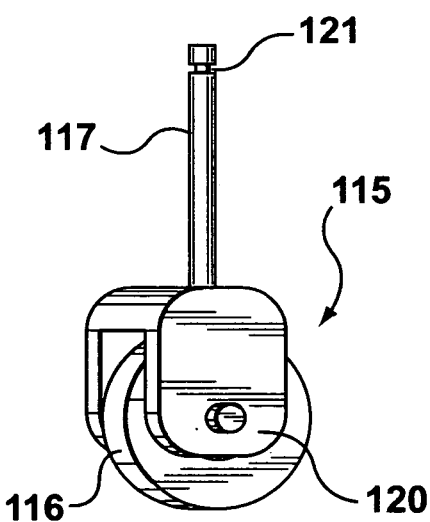
FIG. 8 is an isometric view of the assembly of FIG. 5.

The assembly 10 includes a pressure sensing element 11. The pressure sensing element 11 in the exemplary embodiment of FIGS. 1, 3 & 4 is a conventional aneroid chamber, such as shown and described in U.S. Pat. Nos. 4,238,958, 4,255,970, 4,361,048, 4,543,824, 4,733,564, or 4,953,404. Alternatively the pressure sensing element 11 may comprise almost any other type of conventional or hereafter developed mechanical element that senses pressure and moves in a (e.g. generally linear) path, such as a bellows or diaphragm. Such a path is schematically illustrated by line 12 in FIGS. 3 & 4. The aneroid chamber 11 is preferably attached to a conventional threaded rod 13 (e.g. as shown in U.S. Pat. No. 4,238,958) that allows adjustment of the position of the chamber 11 for calibration or other purposes.

The assembly 10 further comprises a cam 15 having a first, curved, surface 16, and a second surface 17. In the embodiment illustrated, the second surface 17 comprises a lever arm integral with the curved surface 16. The entire cam (surface 16 and lever 17) may be molded or otherwise integrally formed out of a common material, such as wood, plastic or metal. The cam 15 also includes an opening 18, or other manifestation, that allows the cam to be pivoted for rotation about a first axis 19 [see FIG. 3]. For example, the opening 18 may be a through-extending opening that receives the metal pivot pin 20, which defines the axis 19. The lever arm 17 may also include an opening 21 or other manifestation that facilitates the attachment of a force transmitting element 22 thereto.

While the force transmitting element 22 may comprise a bar or rod, or the like, preferably it comprises a strand or a combination bar/rod and strand. The strand may be a wire, cable, rope, ribbon, chain, or the like, or combinations thereof, or combinations with a bar or rod. In the embodiment actually illustrated in the drawings, the element 22 comprises a relatively rigid bar 23 having a T-shaped end 24 which is mounted in openings 21 at the end of the lever arm 17 of cam 15, and a flexible chain 25 (like a conventional pull chain on a light or overhead fan fixture, or such as shown in U.S. Pat. No. 4,255,970) operatively connected to the bar 23. The free end 26 of the chain 25 is operatively connected by any suitable conventional or hereafter developed mechanism—such as a pin, weld, solder, junction, or the like [not shown]—to the shaft 28. A pulley, sprocket, or any other suitable intermediate element may also be used connected to shaft 28 depending upon the exact configuration of the element 22. The element 22 may be of any suitable material, such as metal or plastic, being of inexpensive steel in the embodiment actually illustrated.

The shaft 28 is mounted for rotation about a second axis 29 (see FIGS. 2 & 3) and preferably is of metal or plastic. The second axis 29 is preferably substantially perpendicular to the first axis 19, as clear from FIG. 3, although the axes 19, 29 are spaced from each other (e.g. horizontally)—that is they do not intersect, although planes containing them do. Alternatively, the axis 29 may be substantially parallel to the axis 19, or skewed with respect thereto. Preferably the axes 19, 29 always maintain the same relationship with respect to each other regardless of the amount of movement between the cam 15 and shaft 28.

The shaft 28 may comprise a conventional spindle, and may be mounted for rotation by the mounting element 31. The element 31 comprises substantially parallel top and bottom plates 32, 33, respectively, spaced from each other by posts 34. The top plate 32 has a first bearing opening 35 therein just large enough to receive the main body of the shaft 28 for rotation, while the bottom plate 33 has a smaller opening 36 therein to receive the tapered bottom portion 37 of the shaft 28, and provide a second bearing surface. The unit 31 thus mounts the shaft 28 for precise essentially purely rotational (no tipping or wobbling) movement about the axis 29 and so that the axis 29 always maintains substantially the same angle (e.g. substantially perpendicular) with respect to the axis 19.

The shaft 28 is operatively connected to pointer 40. The pointer 40 may comprise any conventional or to be hereafter developed indicator. That is, the pointer 40 may have the generally arrow shape illustrated in FIG. 1, or may have other shapes, like conventional clock, thermometer, altimeter, barometer, or like instrument hands, although normally small (e.g. about 0.2 gram) and balanced pointers are preferred. The pointer 40 is operatively connected to the shaft 28 by any suitable conventional or to be hereafter developed mechanism(s). In the embodiment illustrated in the drawings, the pointer 40 has a downwardly extending sleeve 41 having an interior diameter or configuration substantially the same as that of the shaft 28 so that there is frictional engagement between 41, 28 so that rotation of shaft 28 is translated into precise identical rotation of the pointer 40. Alternatively the sleeve 41 may be keyed to the shaft 28.

It is desirable to bias the shaft 28 to a predetermined position, related to the characteristics of the aneroid chamber 11. This may be accomplished, as is conventional [see U.S. Pat. No. 4,361,048], by a torsion spring 43 operatively connected to the shaft 28 and a stationary structure (such as the support 45 to be hereafter described, or part of the unit 31 when it is substantially rigidly connected to support 45). Other types of biasing devices, such as coil or leaf springs, or blocks or other shapes of elastomeric material, may alternatively be provided. The torsion spring 43 also—through connection of the shaft 28 to the cam 15—biases the cam surface 16 into operative engagement with (actual direct contact in the embodiment illustrated) the aneroid chamber 11.

Figure 2:
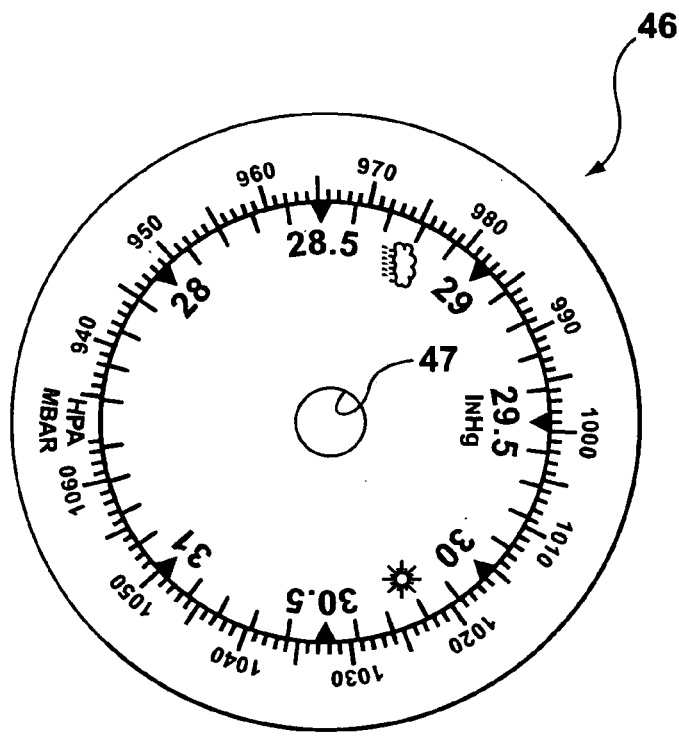
FIG. 2 is a top plan view of an exemplary scale used with the assembly of FIG. 1 when the device functions as a barometer.

As is conventional, the pointer 40 rotates in a plane, moving with respect to a scale, shown in top view at 46 in FIG. 2, and shown schematically in dotted line at 46 in FIGS. 3 & 4. The indicia on the scale 46 indicate atmospheric pressure when the assembly 10 functions as a barometer (as illustrated in FIG. 2), or other indications of pressure, pressure change, or the like, when the assembly 10 is used for other purposes.

The operative elements of the assembly 10 are preferably mounted by a common support, illustrated generally at 45 in FIGS. 2 & 3. The support 45 may have a main body portion 48 with outwardly extending substantially parallel arms 49, 50 mounting the aneroid chamber 11 (with the set screw 13), and cam pivot pin 20, respectively. The dimensions of elongation of the arms 49, 50 are preferably substantially perpendicular to the axes 19, 29. There is a fortified base 51 of the arm 50 which supports the mounting element 31. For example, the bottom plate 33 of the unit 31 may be integral with the base 51, or be adhesively, or rigidly but removably, attached to the base 51. Any suitable operative connection may be provided.

The base 45 may also have a plurality of openings 53 (see FIG. 3) which can receive fasteners for fastening the base onto any other structure, such as part of a housing. The entire construction illustrated in FIGS. 3 & 4 may be mounted in any conventional housing, such as of the types illustrated in U.S. Pat. Nos. 4,255,970, 4,361,048, 4,543,824, 4,733,564, or 4,953,404.

In operation, the components of the assembly 10 are mounted on the support 45 as illustrated in FIGS. 3 & 4, and the set screw 13, scale 46, and/or spring 43 are adjusted and/or positioned so that the pointer 40 is properly calibrated with respect to the scale 46 given the initial atmospheric pressure sensed by the aneroid chamber 11. As the atmospheric pressure changes, the center of the chamber 11 will move in the path 12 [see FIG. 4]. The engagement between the curved surface 16 of the cam 15 and the chamber 11 causes the cam 15 to rotate about the axis 19. This in turn causes the lever arm 17 to pivot, and this movement, perhaps combined with the bias of spring 43, is transmitted through the element 22 to the shaft 28, causing the shaft 28 to rotate about axis 29 an amount corresponding to the pressure change sensed by the chamber 11. Preferably the path 12 is generally linear. However, even if the chamber 11 moves/deflects in path 12 in a non-linear manner, the curvature of the cam surface 16 can be designed to ensure that the movement of the pointer 40 is "linear" (a precisely related arcuate amount).

While the invention has been shown in what is perceived to be the most practical and preferred embodiment, it should be understood that many modifications may be made within the scope of the invention, which scope is only to be limited by the prior art. For example, as one of many modifications, the form of cam (and lever) illustrated in FIGS. 5-8 may be utilized. In FIGS. 5-8 components comparable to those in the FIGS. 1, 3 & 4 embodiment are shown by the same reference numerals only preceded by a "1".

In the FIGS. 5-8 embodiment, the cam 115 is in the form of a roller, ball bearing, or—as illustrated—a section of a ball bearing, having the curved surface 116 thereof biased into operative engagement with the pressure sensor [11 in FIG. 1]. The "second surface" of the cam 115 is the lever 117. The lever 117 is pivoted to the cam 115, and the cam 115 is mounted for rotation, by pivot 120, defining axis 119 [FIGS. 5 & 7]. The pivot 120 engages a central opening 118 [see FIG. 7] in the cam/roller 115, and in the embodiment illustrated pivot 120 comprises a pair of spherical surfaces. The top 121 of the lever 117 is connected to a force transmitting element [like 22 in FIG. 1], as described in the FIGS. 1, 3 & 4 embodiment.

The invention is to be accorded the broadest interpretation of the appended claims so as to encompass all equivalent structures and assemblies.

What is claimed is:

1. An analog pressure indicator assembly comprising: a pressure sensitive element having a first portion that moves in a path in response to pressure; a cam having a first curved surface and a second surface, and mounted for rotation about a first axis, and said curved first surface operatively engaging said first portion of said pressure sensitive element; a force transmitting element which is capable of transmitting a force; a shaft mounted for rotation about a second axis spaced from said first axis; a pointer operatively connected to said shaft; and, said force transmitting element operatively connecting said cam second surface to said shaft in order to cause said shaft to rotate about said second axis in response to said pressure sensitive element rotating said cam about said first axis.

2. An assembly as recited in claim 1 wherein said first and second axes are substantially perpendicular.

3. An assembly as recited in claim 1 further comprising a device which biases said cam into operative engagement with said pressure sensitive element.

4. An assembly as recited in claim 1 wherein said force transmitting element comprises, at least in part, a strand.

5. An assembly as recited in claim 4 wherein said force transmitting element comprises a strand and a bar or rod, and wherein said cam second surface comprises a lever connected to said rod or bar.

6. An assembly as recited in claim 1 wherein said cam comprises a roller, ball bearing, or section of a ball bearing.

7. An assembly as recited in claim 1 further comprising a scale having indicia therein, and a housing containing said pressure sensitive element, pointer, and cam, said pointer mounted within said housing to move with respect to said scale in response to movement of said pressure sensitive element.

8. An assembly as recited in claim 7 wherein the movement of said pressure sensing element first portion is non-linear, and wherein said cam curved surface is shaped to transform the non-linear movement of said pressure element first portion into substantially precisely accurate arcuate movement of said pointer with respect to said scale.

9. A gearless barometer comprising: an aneroid chamber having a central portion which moves along a path; a cam having a curved surface which engages said aneroid chamber and which rotates about a first axis at a location spaced from the path; a pointer which rotates about a second axis at all times having the same relationship to said first axis; and an operative connection between said cam and said pointer which transforms rotation of said cam about said first axis to an accurately comparable rotation of said pointer about said second axis without gears.

10. A barometer as recited in claim 9 wherein said cam curved surface is biased into operative engagement with said aneroid chamber.

11. A barometer as recited in claim 9 which provides only single stage amplification.

12. A barometer as recited in claim 9 wherein said cam comprises a roller, ball bearing, or section of a ball bearing.

13. A barometer as recited in claim 9 further comprising a lever integral with said cam, and wherein said cam and lever are molded or otherwise integrally formed of metal, wood, or plastic, and wherein said lever is operatively connected to said operative connection between said cam and pointer.

14. A barometer as recited in claim 9 wherein said aneroid chamber path is substantially linear; or wherein said path of movement of said aneroid chamber is non-linear, and wherein said cam curved surface is shaped to transform said non-linear movement into substantially precisely accurate arcuate movement of said pointer.

15. A barometer as recited in claim 13 wherein said operative connection between said cam lever and said pointer comprises a strand, or a strand connected to a bar or rod.

16. A gearless pressure indicator assembly consisting essentially of:
   a pressure sensing element;
   a cam mounted for rotation about a first axis and having a curved surface operatively engaging said pressure sensing element and a lever arm extending away from said pressure sensing element;
   a shaft mounted for rotation about a second axis spaced from said first axis, and operatively connected to a pointer;
   a combination bar/rod and strand operatively connected between said lever arm and shaft to transform pivotal movement of said lever arm into rotation of said shaft; and
   a biasing element which biases said cam curved surface into operative engagement with said pressure sensing element.

17. An assembly as recited in claim 16 wherein said movement of said pressure sensing element is non-linear, and wherein said cam curved surface is shaped to transform said non-linear movement of said pressure sensing element into substantially precisely accurate arcuate movement of said pointer.

18. An assembly as recited in claim wherein 16 wherein said cam comprises a roller, ball bearing, or section of a ball bearing.

19. An assembly as recited in claim 16 wherein said cam and lever arm are integral, molded or otherwise integrally formed of metal, wood, or plastic.

20. An assembly as recited in claim 16 wherein said biasing element comprises a torsion spring.

* * * * *